United States Patent
Kobayashi et al.

(10) Patent No.: US 12,005,851 B2
(45) Date of Patent: Jun. 11, 2024

(54) VEHICLE AIRBAG DEVICE AND MANUFACTURING METHOD THEREFOR

(71) Applicant: Autoliv Development AB, Vargarda (SE)

(72) Inventors: Yuto Kobayashi, Kanagawa (JP); Tsutomu Sakurai, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/999,804

(22) PCT Filed: May 17, 2021

(86) PCT No.: PCT/JP2021/018553
§ 371 (c)(1),
(2) Date: Dec. 22, 2022

(87) PCT Pub. No.: WO2021/246140
PCT Pub. Date: Dec. 9, 2021

(65) Prior Publication Data
US 2023/0347845 A1 Nov. 2, 2023

(30) Foreign Application Priority Data

Jun. 2, 2020 (JP) .................................. 2020-096041

(51) Int. Cl.
*B60R 21/217* (2011.01)
*B60R 21/231* (2011.01)
(Continued)

(52) U.S. Cl.
CPC .......... *B60R 21/217* (2013.01); *B60R 21/231* (2013.01); *B60R 21/237* (2013.01);
(Continued)

(58) Field of Classification Search
CPC .................................................. B60R 21/207
See application file for complete search history.

(56) References Cited

U.S. PATENT DOCUMENTS

| | | | |
|---|---|---|---|
| 2011/0316263 A1 | 12/2011 | Lunt et al. | |
| 2015/0158454 A1* | 6/2015 | Shibata | B60R 21/239 |
| | | | 280/742 |

FOREIGN PATENT DOCUMENTS

| | | |
|---|---|---|
| DE | 102016120368 A1 | 4/2018 |
| JP | 2006-076392 A | 3/2006 |

(Continued)

*Primary Examiner* — Nicole T Verley
(74) *Attorney, Agent, or Firm* — Harness, Dickey & Pierce, P.L.C.; Stephen T. Olson (57) ABSTRACT

A vehicle airbag device and a method for manufacturing the same, in which stud bolts for securing the device to the vehicle body can be inserted avoiding the sewn sections, and in which unbalanced stresses are not generated in the panel parts during expansion and deployment.

The device having a pair of panel parts, a pair of expansion parts integrally provided on the pair of panel parts, the expansion part of the first panel part overlapping the second panel part, and the expansion part of the second panel part overlapping the first panel part, forming an overlapping section by joining each expansion part to each panel part at a sewn section, and joining the overlapping section with a pair of panel part outer edges, the outer sewn section forming a hollow bag body, and providing inflator insertion holes and bolt insertion holes provided through the overlapping section.

15 Claims, 5 Drawing Sheets

(51) Int. Cl.
   *B60R 21/237*   (2006.01)
   *B60R 21/21*    (2011.01)
   *B60R 21/235*   (2006.01)

(52) U.S. Cl.
   CPC ......... *B60R 21/21* (2013.01); *B60R 21/23138* (2013.01); *B60R 21/235* (2013.01); *B60R 2021/23538* (2013.01); *B60R 2021/23576* (2013.01)

(56) References Cited

FOREIGN PATENT DOCUMENTS

| | | | | |
|---|---|---|---|---|
| JP | 2006-321327 A | | 11/2006 | |
| JP | 2010-184595 A | | 8/2010 | |
| JP | 2010-221737 A | | 10/2010 | |
| JP | 2013-086731 A | | 5/2013 | |
| JP | 2015-157529 A | | 9/2015 | |
| KR | 10-2014-0132188 A | | 11/2014 | |
| KR | 20180055980 A | * | 5/2018 | |
| WO | WO-2011102224 A1 | * | 8/2011 | ......... B60R 21/2171 |
| WO | 2016/006296 A1 | | 1/2016 | |
| WO | 2016/072291 A1 | | 5/2016 | |
| WO | WO-2018123427 A1 | * | 7/2018 | ........... B60R 21/207 |
| WO | WO-2019026663 A1 | * | 2/2019 | ........... B60R 21/207 |

\* cited by examiner

VEHICLE AIRBAG DEVICE AND MANUFACTURING METHOD THEREFOR

TECHNICAL FIELD

The present invention relates to a vehicle airbag device and a method for manufacturing the same, in which stud bolts for securing the device to the vehicle body can be inserted avoiding sewn sections, and in which unbalanced stresses are not generated in the panel parts during expansion and deployment.

BACKGROUND TECHNOLOGY

Patent Document 1 details knowledge regarding a vehicle airbag cushion in which stud bolts that attach the inflator to the vehicle body penetrate the location of the sewn section of the bag body.

In the "side-impact airbag device" according to Patent Document 1, the airbag is a bag-shaped piece of sheet material such as cloth, resin, etc., the interior of which is divided into a lower chamber and an upper chamber by a seam. Vent holes are provided in the upper chamber. The trailing edge of this seam is slightly separated from the trailing edge of the airbag, and a check valve is provided at the separation between this seam and the trailing edge of the airbag. The check valve is cylindrical and a rod-shaped gas generator is placed therein. The gas generator is positioned so that the longitudinal direction thereof is vertical. The check valve consists of two sheets overlapped with seams sewed at both sides to prevent gas from escaping from the lower chamber to the upper chamber.

In Patent Document 1, as can be seen in FIG. 2 and FIG. 4, the stud bolts for attaching the gas generator to the case (vehicle body) penetrate the seam location at the rear edge of the airbag, where they are joined by a pair of left and right panel parts.

PRIOR ART DOCUMENTS

Patent Documents

Patent Document 1: Japanese Unexamined Patent Application 2004-256017

SUMMARY OF THE INVENTION

Problem to be Solved by the Invention

In background art, a through hole is formed through the airbag cushion at the sewn section position (seam location) of an airbag cushion (airbag) with a pair of left and right panel parts. The stud bolt of the inflator (gas generator) is then passed through this through-hole from the inside of the airbag cushion toward the outside, and the stud bolt protruding from the sewn section position is used to attach the inflator to the vehicle body.

The sewn section position is a complex area where the bag base materials that make up the airbag cushion are overlapped for sewing and the sewing threads that make up the sewn section are sewn into the bag base materials, which are thick and hard. Even if one tries to mount the inflator to the vehicle body at this thick and stiff sewn section position and tightens the stud bolt firmly, the complex area will repel this tightening, and thus the stud bolt cannot be tightened properly and sufficiently.

If the stud bolts are not sufficiently tightened, the stud bolts may sag over time after the airbag cushion is installed and secured to the vehicle body, and when the airbag device is activated, there is a risk that stable occupant protection performance as designed cannot be ensured.

To prevent such a situation, the position of the stud bolt through-holes could be set to avoid the sewn section position of the airbag cushion. In other words, it is conceivable to form a through hole in the first panel part of the airbag cushion, for example, in one of the left and right panel parts, so that the panel part that repels to a lower degree the stud bolt tightening due to its reduced thickness and hardness, can be used for attachment to the vehicle body with stud bolts. This is a feasible way to attach the stud bolt to the vehicle body.

However, if the position of the sewn section position is avoided, or in other words, the first of the panel parts of the pair is attached to the vehicle body with stud bolts, the force acting on the first panel part of the pair and the force acting on the second panel part during expansion and deployment of the airbag cushion will not be equal and will be significantly different, causing different stress on the pair of panel parts, which has a concern of causing the airbag cushion to burst due to cracks in one of the panel parts that cannot withstand the stress.

In light of the conventional problems described above, an object of the present invention is to provide a vehicle airbag device and a method for manufacturing the same, whereby a stud bolt for mounting and securing the device to the vehicle body can be inserted avoiding the sewn part, and whereby unbalanced stress is not generated in the panel parts during expansion and deployment.

Means for Solving the Problems

A vehicle airbag device according to the present invention, includes: a vehicle airbag cushion that is deployed and expanded by inflator gas ejected from an inflator, wherein the airbag cushion includes:
  a pair of panel parts that are folded or overlapped so as to face each other, a pair of expansion parts integrally provided on the pair of panel parts in a manner protruding outwardly from the respective panel parts,
  an overlapping section formed by overlapping the expansion part of the first panel part on the second panel part, and overlapping the expansion part of the second panel part on the first panel part, and joining each expansion part to each panel part at a seam along the expansion part edges,
  an outer sewn section that joins the panel part outer edges facing each other, forming a hollow bag body,
  inflator insertion holes provided through the overlapping section for inserting the above inflator with stud bolts into the inside of the bag body, and
  bolt insertion holes provided through the overlapping section and through which the stud bolts of the inflator are inserted and protrude to the outside of the bag body.

The outer sewn section should have a pair of sewn end parts that reach the overlapping section, and these sewn end parts should intersect the sewn section. Alternatively, these sewn end parts should be provided avoiding the sewing areas.

The inflator insertion holes and bolt insertion holes are preferably located on an imaginary straight line connecting the pair of sewn end parts of the outer sewn section through the overlapping section.

The sewn sections along the edges of the expansion parts that form the overlapping sections are preferably closed in an annular shape.

The pair of expansion parts should each have an inflator insertion hole and a bolt insertion hole, and the inflator insertion hole and bolt insertion hole of the pair of expansion parts should overlap and communicate with each other at the overlapping section.

The outer sewn section is preferably formed to reach the edge of each of the expansion parts.

The overlapping section should have an encircling sewn section that encircles at least one of the inflator insertion holes and the bolt insertion hole and joins the mutually overlapping panel part and the expansion part.

The inflators are preferably cylinder type with a plurality of stud bolts spaced in the length direction, and these stud bolts are inserted into the inflator insertion holes.

The pair of panel parts should have the same external form.

The bag body has an overhang in a position adjacent to the overlapping section in a form that juts over the overlapping section, and the overhang is desirably formed by joining a pair of jutting parts that protrude out from each of the pair of panel parts toward the protruding direction of each expansion part, facing each other, at the outer sewn section.

It is preferred that the bag body is provided with an inflator in the overlapping section of the bag body with a stud bolt protruding through the bolt insertion hole, and the bag body is mounted and secured to the vehicle body via the stud bolts described above.

A method of manufacturing for the vehicle airbag device according to the present invention includes:
a step of forming the panel parts, forming a pair of expansion parts in each of the pair of panel parts, which are folded or overlapped to face each other when manufacturing the airbag cushion, and forming the inflator insertion holes and bolt insertion holes in each of the expansion parts;
a pre-sewing step of overlapping the panel parts, overlapping the expansion part of the first panel part on the second panel part and overlapping the expansion part of the second panel part on the first panel part, so that the inflator insertion holes and bolt insertion holes of each expansion part overlap and connect with each other;
a sewing step of joining each expansion part to each panel part at the sewn sections along the edges of these expansion parts to form the overlapping sections;
and a bag body forming step of joining the outer edges of the pair of panel parts facing each other at the outer sewn sections and forming them into a bag body.

Effect of the Invention

In the vehicle airbag device according to the present invention and the manufacturing method thereof, the stud bolts that affix to the vehicle body can be inserted avoiding the sewn section, and unbalanced stress can be prevented in the panel part during expansion and deployment.

MODE FOR CARRYING OUT THE INVENTION

A preferred Embodiment of a vehicle airbag device according to the present invention and the manufacturing method thereof will hereinafter be described in detail with reference to the accompanying drawings.

The airbag cushion of a vehicle airbag device is deployed and expanded by inflator gas ejected from an inflator to protect occupants, pedestrians, and others in the event of a collision or other critical situation.

In the present Embodiment, the cushion applied to the rear side airbag device will be illustrated as an example of an airbag cushion for the vehicle airbag device according to the present invention.

The airbag cushion of the rear side airbag device is installed by securing it to the rear wheel house or other vehicle body parts with stud bolts.

The airbag cushion is deployed and expanded from the wheelhouse, through the gap between the rear seat cushion and the rear door, and diagonally upward along the trim surface of the rear door.

However, the present invention can be applied to all airbag devices installed in vehicle bodies, such as pedestrian protection airbag devices that deploy and expand between the hood and the front windshield, or so-called curtain airbag devices, driver airbag devices for the driver, side airbag devices for the front seat passenger, or far side airbag devices that deploy and expand between the driver seat and passenger seat.

The following describes the composition of the vehicle airbag cushion of the vehicle airbag device while explaining the manufacturing method thereof.

As is well known, vehicle airbag cushions are produced by folding back a single sheet of bag base material made of fabric or resin sheet, or by overlapping two sheets of bag base materials 1 and 1 and sewing them together to form a hollow bag form.

The vehicle airbag cushion has a pair of panel parts 2a and 2b that are opposed facing each other in this folded or overlapped configuration.

Figure 1:
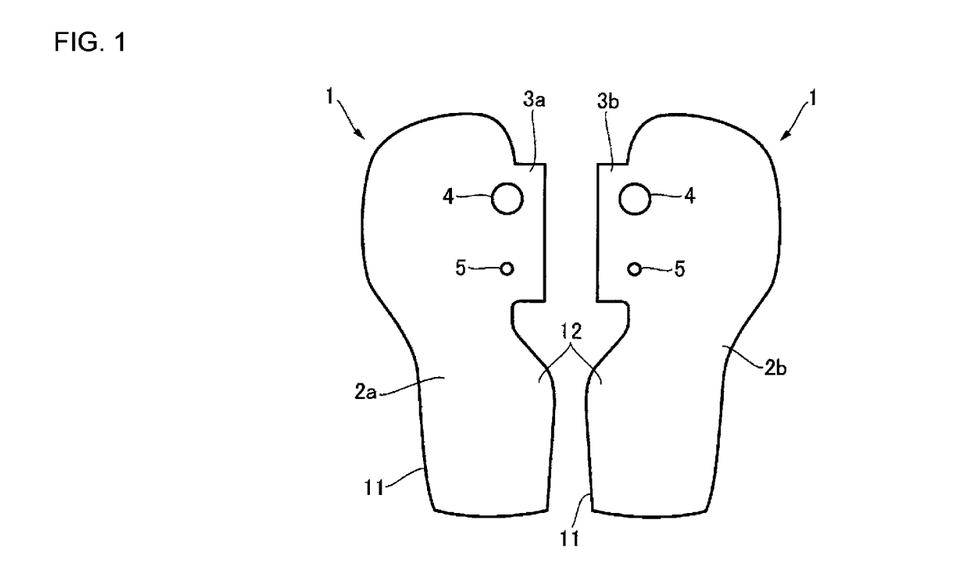
FIG. 1 is an explanatory diagram of the panel part forming process in the manufacturing method of a vehicle airbag device, which describes a suitable Embodiment of the present invention.

FIG. 1, which illustrates this Embodiment, illustrates the case of two sheet bag base materials 1 and 1.

The overlapping of these bag base materials 1 and 1 produces a vehicle airbag cushion formed by a pair of panel parts 2a and 2b overlapping and facing each other.

First, the panel part forming process is explained with reference to FIG. 1.

For each of the two bag base materials 1 and 1 used for manufacturing, their panel parts 2a and 2b are formed with an external contour that matches the external form of the final product, the vehicle airbag cushion.

Each of the bag base materials 1 and 1 are integrally provided with expansion parts 3a and 3b in the form of outwardly protruding from the panel parts 2a and 2b, respectively.

This embodiment illustrates a case in which the expansion parts 3a and 3b are formed in one piece on each of the panel parts 2a and 2b in the bag base materials 1 and 1, respectively.

Of course, it is also possible to prepare expansion parts 3a and 3b as separate parts to the panel parts 2a and 2b formed in the bag base materials 1 and 1, and to join the expansion parts 3a and 3b integrally to the respective panel parts 2a and 2b.

The expansion parts 3a and 3b formed in each of the bag base materials 1 and 1 are positioned facing each other when the pair of panel parts 2a and 2b are overlapped and facing each other with their external contours aligned.

Such positioning means that these pairs of expansion parts 3a and 3b are formed in the same position with respect to the outline contours of the panel parts 2a and 2b.

Preferably, the two bag base materials 1 and 1 are formed with the same shape between the pairs of panel parts 2a and 2b thereof and the pairs of expansion parts 3a and 3b thereof. The expansion parts 3a and 3b do not have to be the same shape with respect to each other.

Each of the expansion parts 3a and 3b has an inflator insertion hole 4 with a hole diameter that allows insertion of an inflator therethrough.

Each of the expansion parts 3a and 3b has a bolt insertion hole, with a hole diameter that enables insertion of a stud bolt to attach the inflator to the vehicle body.

The vehicle airbag device according to the present Embodiment incorporates a well-known cylinder-type inflator as the inflator.

Figure 5:
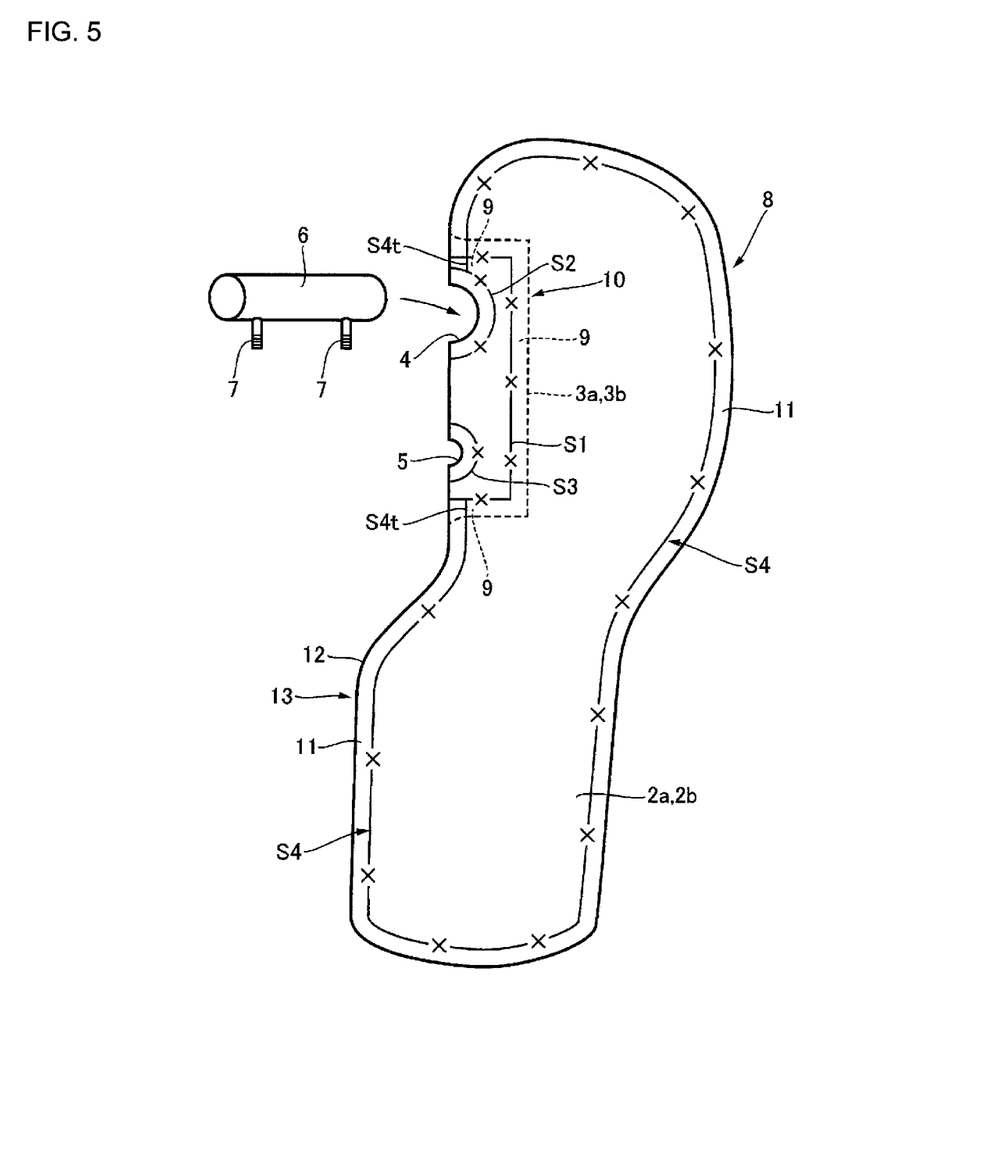
FIG. 5 is a side surface view of the vehicle airbag device which describes a suitable Embodiment of the present invention.
Figure 6:
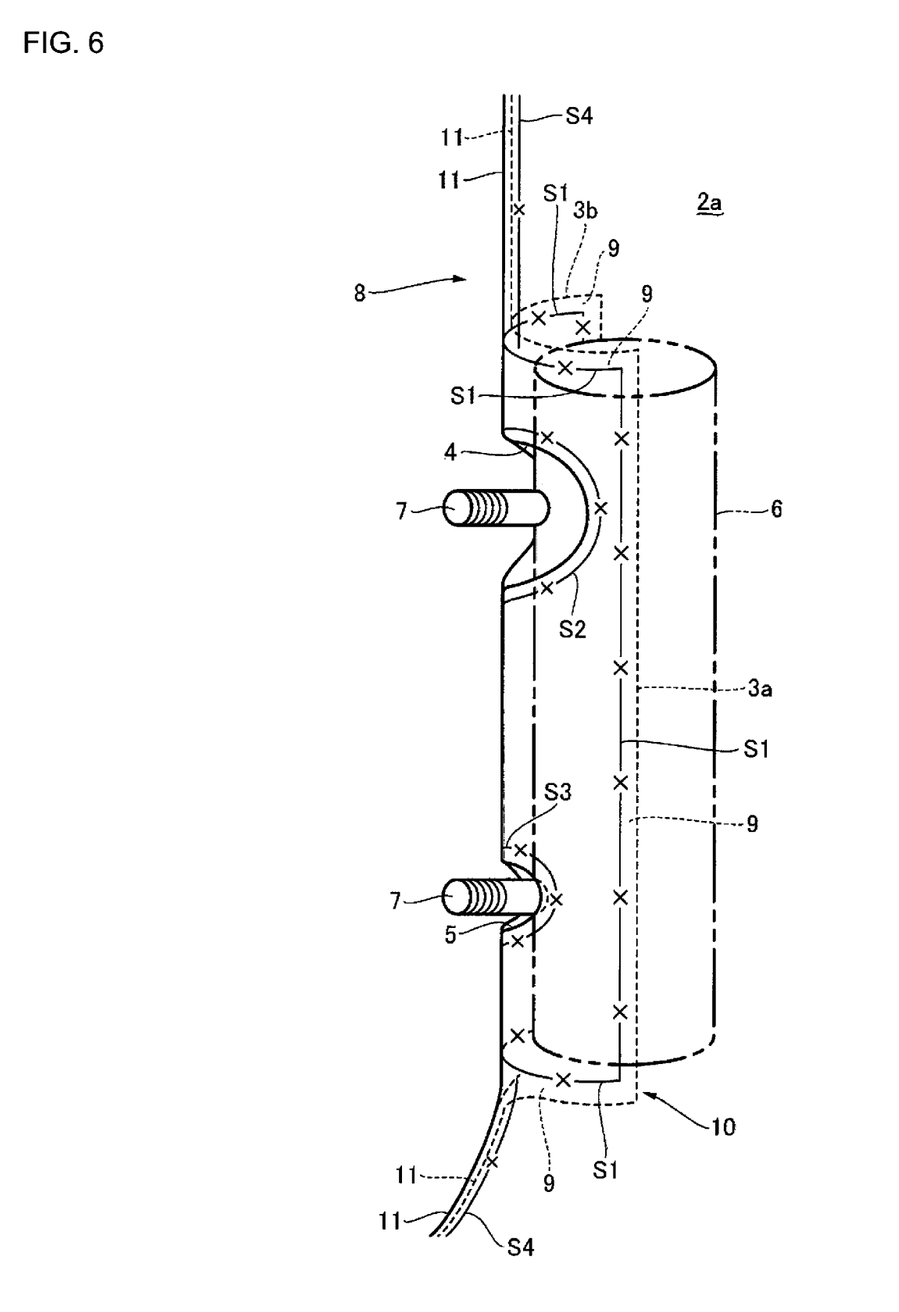
FIG. 6 is an enlarged perspective view of the key section of the vehicle airbag device as illustrated in FIG. 5.

The inflator 6 has a plurality of stud bolts 7 spaced in the length direction (see FIG. 5 and FIG. 6).

The vehicle airbag device is configured by mounting the inflator 7 to the airbag cushion (equivalent of bag body 8 described below).

The inflator 6 is not limited to a cylinder type, but can also be a disk type inflator with stud bolts 7 arranged in an annular pattern.

The inflator insertion holes 4 and bolt insertion holes 5 in a first expansion part 3a and the inflator insertion holes 4 and bolt insertion holes 5 in a second expansion part 3b are formed in an arrangement connected to each other in series when they are joined in the sewn section in the pre-sewing step or sewing step described below.

Specifically, these inflator insertion holes 4 and bolt insertion holes 5 in each of the expansion parts 3a and 3b are formed at the same location with respect to the external contour of the panel parts 2a and 2b.

Next, the pre-sewing step is described.

In the pre-sewing step, the two bag base materials 1 and 1 are placed so that the pair of expansion parts 3a and 3b face each other, as illustrated in FIG. 1.

Next, the expansion part 3a of the first panel part 2a is overlaid on the second panel part 2b, and the expansion part 3b of the second panel part 2b is overlaid on the first panel part 2a.

Figure 2:
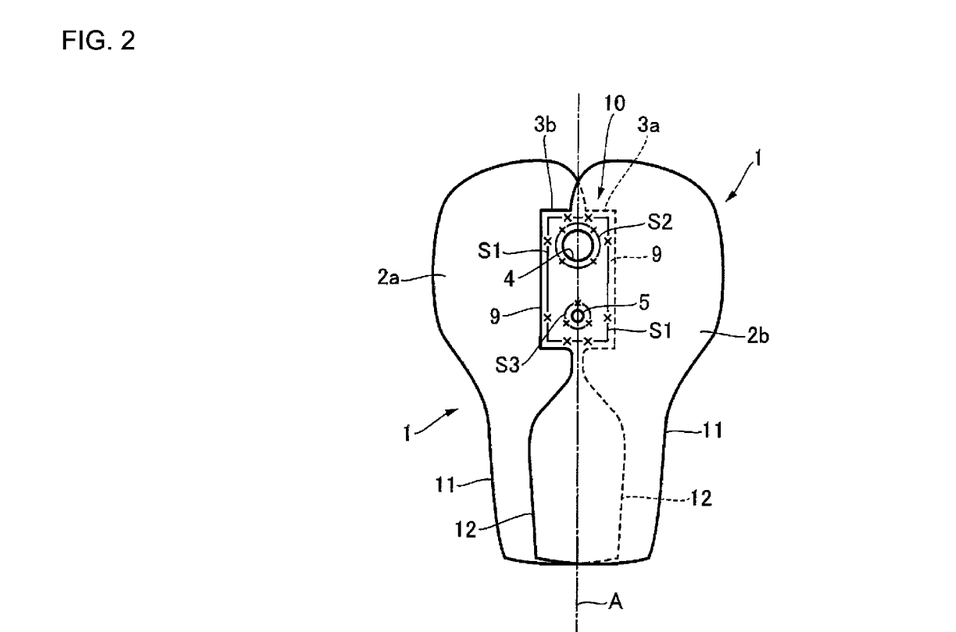
FIG. 2 is an explanatory diagram of the sewing process in the manufacturing method of a vehicle airbag device, which describes a suitable Embodiment of the present invention.

In detail, as illustrated in FIG. 2, the first expansion part 3a of the first panel part 2a is overlaid on a first of the front and back sides of the second panel part 2b, and at the same time, the second expansion part 3b of the second panel part 2b is overlaid on a second of the front and back sides of the first panel part 2a.

The inflator insertion holes 4 and bolt insertion holes 5 of the pair of expansion parts 3a and 3b should overlap with each other and communicate together.

For example, a first expansion part 3a (hereinafter referred to as the first expansion part) is overlaid on the back side of the second panel part 2b (hereinafter referred to as the second panel part), and the second expansion part 3b (hereinafter referred to as the second expansion part) is overlaid on the front surface of the first panel part 2a (hereinafter referred to as the first panel part).

As described above, the pair of first and second expansion parts 3a and 3b, formed at the same position with respect to the contour outline of the panel parts 2a and 2b, are superimposed on the panel parts 2a and 2b, respectively, so that they are mutually arranged side by side across the first panel part 2a and second panel part 2b.

The pre-sewing step simply overlaps the two bag base materials 1 and 1 so that the expansion parts 3a and 3b overlap the panel parts 2a and 2b.

The arrangement of the two bag base materials 1 and 1 in FIG. 1 is for illustrative purposes and does not necessarily require that the expansion parts 3a and 3b face each other in this manner. The expansion parts 3a and 3b can be overlaid on the panel parts 2a and 2b as described above.

In the case of forming a pair of panel parts 2a and 2b by folding a single bag base material 1, at this stage, a fold appears on the opposite side of the folded area, where each expansion part 3a and 3b overlaps along the back surface and front surface of each panel part 2a and 2b respectively.

Next, the sewing step is explained with reference to FIG. 2.

In the sewing step, the expansion parts 3a and 3b and the panel parts 2a and 2b, which are overlapped in the pre-sewing step, are sewn together.

Sewing is the joining of the first expansion part 3a to the second panel part 2b and the second expansion part 3b to the first panel part 2a.

The first expansion part 3a and the second expansion part 3b are arranged next to each other in a side-by-side arrangement as described above.

The sewing line joining the first expansion part 3a to the second panel part 2b and the sewing line joining the second expansion part 3b to the first panel part 2a ensure a series of connections.

In the present Embodiment, these sewing lines are set as sewn sections 51 surrounding both the inflator insertion holes 4 and bolt insertion holes 5 in this configuration.

The sewn sections 51 form a closed annulus between the first expansion part 3a and the second expansion part 3b and along the edge 9 of these expansion parts 3a and 3b.

In short, each of the expansion parts 3a and 3b is joined to each of the panel parts 2a and 2b respectively at the sewn sections 51 along the edge 9 of these expansion parts 3a and 3b.

The sewn sections 51 do not have to be in annular form, as long as they are formed along the edge 9 of these expansion parts 3a and 3b, such as on both sides of both inflator insertion holes 4 and bolt insertion holes 5.

This sewn section 51 (hereinafter referred to as the annular sewn section 51) joins the pair of expansion parts 3a and 3b to the respective panel parts 2a and 2b. The annular sewn section 51 partially connects the pair of panel parts 2a and 2b.

In the case of forming a pair of panel parts 2a and 2b by folding one bag base material 1, this annular sewn section 51 will make the bag base material 1 a cylindrical form.

By joining each of the expansion parts 3a and 3b to each of the panel parts 2a and 2b with the annular sewn sections 51, the panel parts 2a and 2b have two overlapping sections that increase in thickness due to the overlapping of the expansion parts 3a and 3b, and a section where the expansion parts 3a and 3b are not overlapped.

By overlapping the two panels, the panel parts 2a and 2b partially form an overlapping section 10.

This overlapping section 10 will be a thicker-walled portion of the bag body 8 (airbag cushion) than the rest of the bag body when the bag body 8 (airbag cushion) is completed, as described below.

Both the inflator insertion hole 4 and the bolt insertion hole 5 are provided through this overlapping section 10.

In the overlapping section 10, an encircling sewn section S2 is formed that encircles the inflator insertion hole 4 and joins the panel parts 2a and 2b and expansion parts 3a and 3b that are overlapped with each other.

An encircling sewn section S3 is formed in the overlapping section 10 that encircles the bolt insertion holes 5 and joins the panel parts 2a and 2b and expansion parts 3a and 3b that are overlapped with each other.

These encircling sewn sections S2 and S3 suppress the leakage of inflator gas to the outside of the bag body 8 (airbag cushion).

The inflator gas flows into the gap in the overlapping section 10 overlapping the panel parts 2a and 2b and expansion parts 3a and 3b through the annular sewn section 51, where the joining is performed by sewing.

Therefore, there is a risk of inflator gas leaking from the overlapping section 10 to the outside of the bag body 8 through the inflator insertion holes 4 and bolt insertion holes 5.

In this Embodiment, this leakage is suppressed by the encircling sewn sections S2 and S3. The encircling sewn sections S2 and S3 also contribute to reinforcement around the insertion holes 4 and 5.

Next, the bag body forming process is described with reference to FIG. 3 and FIG. 4.

In FIG. 2, the alternate long and short dashed line indicates the fold line A where a pair of bag base materials 1 and 1 formed in the same shape (same outline contour) are overlapped so that the pair of panel parts 2a and 2b overlap each other and face each other.

This fold line A is approximately where both the inflator insertion holes 4 and bolt insertion holes 5 in the overlapping section 10 pass in series.

Figure 3:
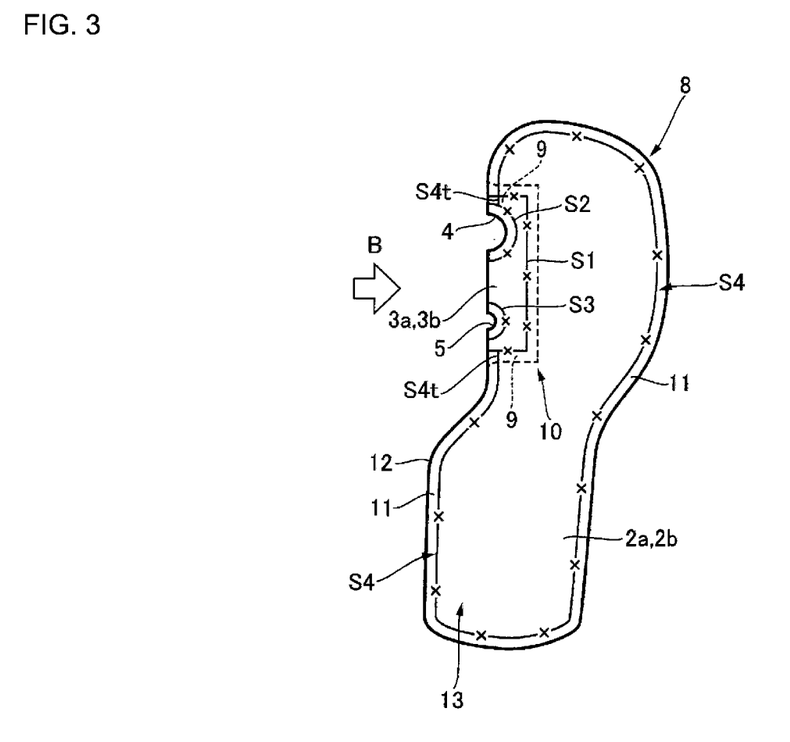
FIG. 3 is an explanatory diagram of the bag body forming process in the manufacturing method of a vehicle airbag device, which describes a suitable Embodiment of the present invention.
Figure 4:
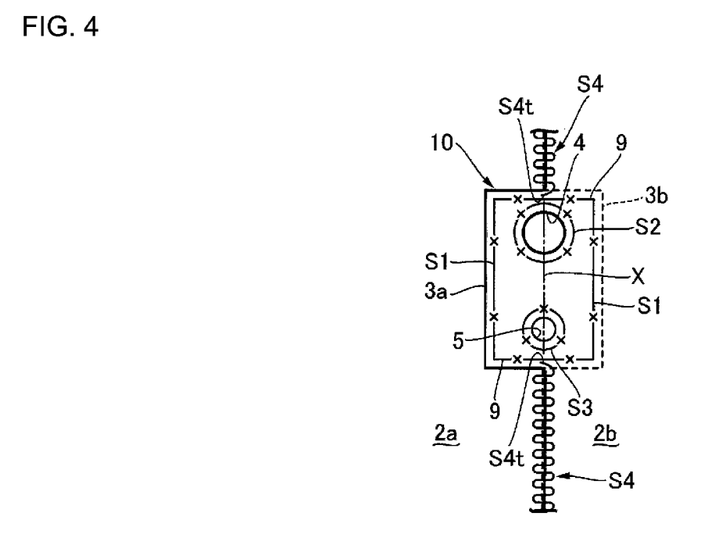
FIG. 4 is an enlarged view of the key section in FIG. 3 in direction B.

FIG. 3 illustrates a pair of bag base materials 1 and 1 overlapping each other via a fold line A. In this case, the pair of panel parts 2a and 2b are superimposed facing each other.

The outer circumferential edges 11 of these pairs of panel parts 2a and 2b are provided with outer sewn sections S4, which are circumferentially around the panel parts 2a and 2b along the outer edges 11 and join the first and second panel parts 2a and 2b together.

In this Embodiment, the outer sewn sections S4 are formed in this configuration, avoiding the overlapping section 10. Specifically, the outer sewn sections S4 are formed so as not to intersect with the annular sewn section 51 of the overlapping section 10.

As illustrated in the figure, the outer sewn sections S4 have a sewn end part S4t that reaches the overlapping section 10, and the sewn end part S4t is provided avoiding the annular sewn section 51.

The sewn end part S4t refers to the outer sewn section S4 within a prescribed length range from the end of sewing up to and including the end.

In the case of two bag base materials 1 and 1 connected by an annular sewn section 51, and in the case of a single bag base material 1 by folding, both are formed into a hollow bag body 8 with a pair of panel parts 2a and 2b by the outer sewn sections S4.

In other words, these pairs of panel parts 2a and 2b are joined by the annular sewn section 51 at the portion where the expansion parts 3a and 3b overlap, and are joined by the outer sewn section S4 at the portion where the expansion parts 3a and 3b do not overlap to form an integrated bag body.

The outer sewn sections S4 are preferably formed so as not to intersect the already sewn annular sewn section 51, as described above, and to reach the edge 9 of the expansion parts 3a and 3b outside of the annular sewn section 51.

This ensures that the sewing line is uninterrupted and extends over the entire external contour of the pair of panel parts 2a and 2b. This creates a well-sealed bag body 8 with no inflator gas leakage.

However, regarding the relationship between the outer sewn sections S4 and the annular sewn section 51, the sewn end parts S4t of the outer sewn sections S4 that reach the overlapping section 10 may intersect the annular sewn section 51 as needed to increase strength around the overlapping section 10 or for various other reasons.

In this case, the sewn end parts S4t are sewn intersecting the annular joint 51 of the overlapping section 10, without avoiding the annular joint 51.

When the pair of panel parts 2a and 2b are joined at the outer sewn section S4 to form the bag body 8, the inflator insertion holes 4 and bolt insertion holes 5 in the overlapping section 10 will be located on an imaginary straight line X (see FIG. 4), connecting the sewn end parts S4t to each other.

In other words, the outer sewn section S4 is interrupted at each sewn end part S4t. The pair of sewn end parts S4t are separated from each other. An imaginary straight line X is a straight line that can be assumed at the overlapping section 10 and that connects a pair of sewn end parts S4t through the overlapping section 10. The inflator insertion holes 4 and bolt insertion holes 5 are provided on this imaginary straight line X.

In the present Embodiment, as illustrated in FIG. 1 to FIG. 3, a pair of jutting parts 12 and 12 are formed in one piece on each of the bag base materials 1 and 1 during the panel part forming process.

These jutting parts 12 and 12 are formed adjacent to the expansion parts 3a and 3b in the same direction as the expansion parts 3a and 3b and protrude from the panel parts 2a and 2b.

The pairs of jutting parts 12 and 12 are formed in the same shape.

In addition, these jutting parts 12 and 12, similar to the pair of expansion parts 3a and 3b, are superimposed facing each other when the pair of panel parts 2a and 2b are superimposed facing each other with the external contours thereof aligned and overlapping each other.

The pairs of jutting parts 12 and 12 can be said to be part of each panel part 2a and 2b. The edges of these jutting parts 12 and 12 are the outer edges 11 of the panel parts 2a and 2b, which are joined by the outer sewn section S4.

The pair of jutting parts 12 and 12 joined at the outer sewn sections S4 form part of the bag body 8. The jutting parts 12 and 12 form an overhang 13 in the bag body 8. The overhang 13 appears as a bulge that juts outward near the overlapping section 1 formed by the expansion parts 3a and 3b when the bag body 8 is expanded with inflator gas.

In other words, the overhang 13 is provided by joining a pair of jutting parts 12 and 12, which protrude from each of the pair of panel parts 2a and 2b toward the protruding direction of each expansion part 3a and 3b, facing each other and are joined at the outer sewn sections S4.

FIG. 5 and FIG. 6 illustrate a vehicle airbag device in which an inflator 6 is inserted inside the bag body 8 of the completed airbag cushion, thereby enabling the attachment of the inflator 6 to the vehicle body with stud bolts 7.

The inflator 6 is inserted from outside the bag body 8 into the interior of the bag body 8 through the inflator insertion hole 4 in the overlapping section 10.

The inflator 6 inside the bag body 8 has the stud bolt 7 thereof protrude from the inside of the bag body 8 to the outside of the bag body 8 through the bolt insertion hole 5 in the overlapping section 10.

Figure 7:
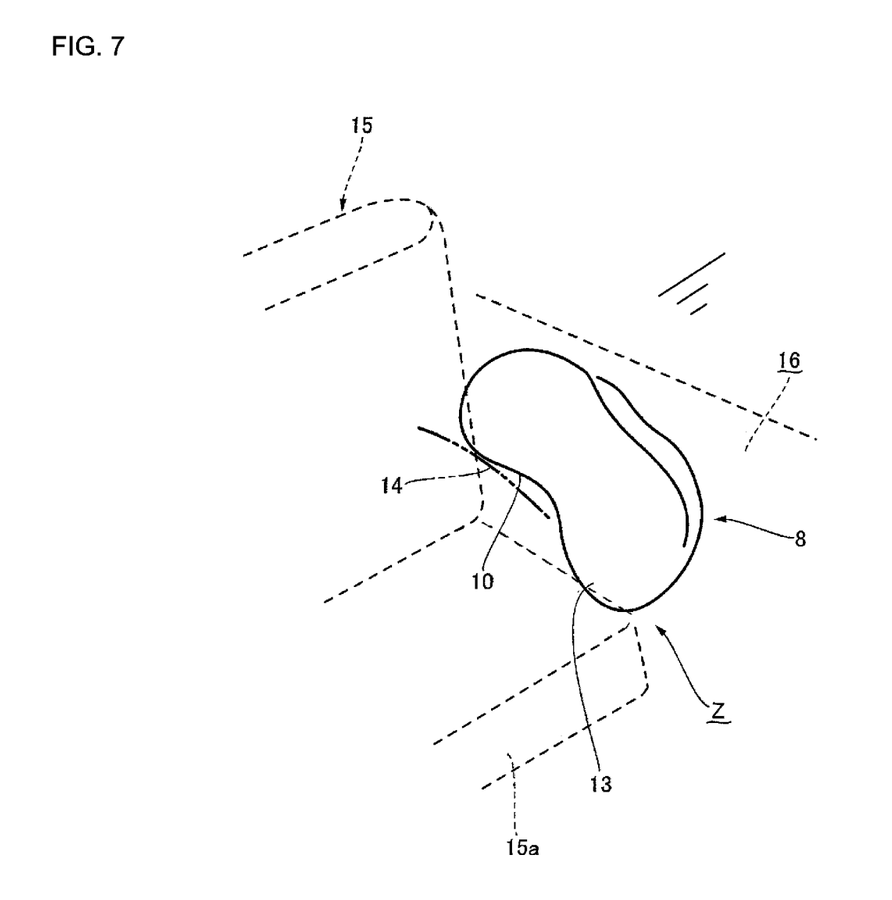
FIG. 7 is a perspective view illustrating a mounted example of the vehicle airbag device according to the present invention, in the case of a rear side airbag device.

This example of a vehicle airbag device in the present Embodiment is a rear side airbag device, as described above, and is installed in the rear wheelhouse 14 of the vehicle body, as illustrated in FIG. 7.

The stud bolt 7 protruding from bag body 8 is fastened to wheelhouse 14 with a nut, and the bag body 8 is mounted and secured to wheelhouse 14 together with the inflator 6 via the stud bolt 7.

As illustrated in FIG. 6, the stud bolts 7 of the inflator 6 are designed to secure the bag body 8 (airbag cushion) to the vehicle body on an assumed imaginary straight line X (see FIG. 4) on the sewing line (outer sewn section S4) of the pair of panel parts 2a and 2b, where the imaginary straight line X is (1) inside the annular sewn section 51, or in other words other than a sewn portion, (2) at least two bag base materials 1 and 1 are overlapped (wall thickened by expansion parts 3a and 3b and panel parts 2a and 2b), and (3) the outer contour of the panels are the same shape.

In the illustration, one of the stud bolts 7 of the inflator 6 protrudes outward from inside the bag body 8 through the inflator insertion hole 4 and is fastened to the wheelhouse 14.

In the rear side airbag device, the expanding and deploying bag body 8 (airbag cushion) expands and deploys diagonally upward from the wheelhouse 14 area toward the interior of the vehicle.

The bag body 8 expands and deploys through a gap Z between the seat cushion 15a of the rear seat 15 and the rear door trim 16.

The bag body 8 is provided with an overhang 13 at a position adjacent to the overlapping section 10 where the inflator 6 is provided, which extends outward from the bag body 8 beyond the position of the overlapping section 10, specifically to the same side as the inflator 6.

The overhang 13 is the portion of the bag body 8 that, during expansion and deployment of the bag body 8, causes a portion of the expanding bag body 8 to extend beyond the imaginary mounting line extending in the longitudinal direction of the mounting portion of the inflator 6 and into the direction of the mounting side.

The overhang 13 expands downward toward the inflator 6 in the opposite direction of the diagonal upward expansion of the bag body 8 to close the gap Z between the rear seat cushion 15a and the rear door trim 16, thereby ensuring the support action of the bag body 8 at the gap Z position.

Therefore, the posture of the bag body 8 is stabilized even though there is no support site on the rear seat cushion 15 side.

A vehicle airbag device manufactured using the manufacturing method according to the present Embodiment is provided with:

(1) a pair of expansion parts 3a and 3b integrally provided with a pair of panel parts 2a and 2b and overlapped on the panel parts 2a and 2b;

(2) an overlapping section 10 formed partially on the panel parts 2a and 2b by joining the expansion parts 3a and 3b and panel parts 2a and 2b using an annular sewn section 51 along the edge 9 of the expansion parts 3a and 3b so as to encircle both the inflator insertion holes 4 and the bolt insertion holes 5; and (3) an outer sewn section S4 that forms a hollow bag body 8 by joining the outer edges 11 of the pair of panel parts 2a and 2b while avoiding the annular sewn section 51 of the overlapping section 10.

This allows the stud bolts 7 of the inflator 6 to be inserted avoiding the sewn sections 51 and S4.

Therefore, when mounting the inflator 6 and bag body 8 to the vehicle body, the stud bolts 7 can be tightened precisely and firmly.

Therefore, it is possible to prevent the stud bolts 7 from slackening over time, allowing the airbag device to provide stable occupant protection performance as designed.

Moreover, the bolt insertion holes 5 for the stud bolts 7 are formed in the overlapping section 10 where the expansion parts 3a and 3b and the panel parts 2a and 2b are overlapped in two layers to increase the strength of the bag body 8.

This overlapping section 10 is not an intricate area due to overlapping and sewing as in the background art, and does not repel the tightening of the stud bolts 7.

This overlapping section 10, in turn, can distribute stress from the tightening of the stud bolt 7 and the expansion effect of the bag body 8 by the inflator gas as the attachment site of the bag body 8 to the vehicle body, and can provide secure mounting that is superior.

Since the overlapping section 10 is formed by overlapping a pair of panel parts 2a and 2b with a pair of expansion parts 3a and 3b, equal stress can be generated on both panel parts 2a and 2b when the bag body 8 is expanded and deployed. This prevents the bag body 8 from bursting.

The outer sewn section S4 is formed to reach the edge 9 of each of the expansion parts 3a and 3b, thus ensuring joint continuity with the annular sewn section 51 of the overlapping section 10. This ensures high strength in the bag body 8.

The overlapping section 10 has encircling sewn sections S2 and S3 that encircle the inflator insertion holes 4 and bolt insertion holes 5 and join the panel parts 2a and 2b and the expansion parts 3a and 3b overlapping each other.

This prevents inflator gas from leaking from between the two-ply expansion parts 3a and 3b and the panel parts 2a and 2b to the outside of the bag body 8 through the insertion holes 4 and 5.

The bag body 8 will have an overhang 13 at a location adjacent to the expansion parts 3a and 3b.

The overhang 13 is formed by joining the jutting parts 12 and 12, which are formed from the pair of panel parts 2a and 2b facing each other and jutting out from each other, at the outer sewn section S4.

The overhang 13 bulges toward the inflator 6 to close the gap around the inflator 6, for example, the gap Z between the rear seat cushion 15a and the rear door trim 16.

This allows the support action of the bag body 8 to be secured at the position of the gap Z, which stabilizes the orientation of the bag body 8 and improves occupant protection performance.

In the bag body 8 (airbag cushion) with the overhang 13, the inflator 6 is difficult to install in a position passing through the outer sewn section S4 joining the panel parts 2a and 2b.

By setting and overlapping the expansion parts 3a and 3b, the outer sewn section S4 can be secured even in a structure with an overhang 13, and the strength of the mounting portion of the inflator 6 can be sufficiently ensured.

The present invention applies to all airbag devices installed in the vehicle body, such as side airbags for rear seats mounted on the body panel above the wheelhouse of the vehicle, side airbags for vehicle seats, such as those mounted on the side of the seat frame facing forward in the occupant side direction of the seat frame, side airbags, pedestrian protection airbags for pedestrian protection outside the front of the vehicle body on the windshield, and curtain airbags such as those mounted on the roof side rails of a vehicle, and the like, and can be used mainly in vehicle airbag devices that use cylinder-type inflators.

The vehicle airbag device and manufacturing method of the same described above are preferred examples of the present invention, and other examples of embodiments can also be implemented or carried out in various ways. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

DESCRIPTION OF CODES

1 and 1. Seat back base material
2a and 2b. Pair of panel parts
3a and 3b. Pair of expansion parts
4. Inflator insertion hole
5. Bolt insertion hole
6. Inflator
7. Stud bolt
8. Bag body
9. Expansion part edge
10. Overlapping section
11. Panel part outer edge
12, 12. Jutting parts
13. Overhang
51. Annular sewn section
S2, S3. Encircling sewn section
S4. Outer sewn section
S4t. Outer sewn section sewn end part

The invention claimed is:

1. A vehicle airbag device, the airbag device comprising:
a vehicle airbag cushion that is deployed and expanded by inflator gas ejected from an inflator, wherein
the airbag cushion includes:
first and second panel parts that are folded or overlapped so as to face each other,
first and second expansion parts integrally provided on the first and second panel parts, respectively, in a manner protruding outwardly therefrom,
an overlapping section at a rear side of the airbag cushion formed by overlapping the first expansion part of the first panel part on the second panel part, and overlapping the second expansion part of the second panel part on the first panel part, and joining each of the first and second expansion parts to at a seams along edges of the first and second expansion parts,
an outer sewn section that joins outer edges of the first and second panel parts that face each other, forming a hollow bag body,
inflator insertion holes provided through the overlapping section for inserting the inflator with stud bolts into the inside of the bag body,
bolt insertion holes provided through the overlapping section and through which the stud bolts of the inflator are inserted and protrude to the outside of the bag body, and
a further overlapping section formed at the rear side of the airbag cushion and spaced from the overlapping section, the further overlapping section defined by a first further expansion part of the first panel overlapping with a second further expansion part of the second panel.

2. The vehicle airbag device according to claim 1, wherein the outer sewn section has a pair of sewn end parts reaching the overlapping section, and the sewn end parts are provided intersecting the sewn section.

3. The vehicle airbag device according to claim 1, wherein the outer sewn section has a pair of sewn end parts reaching the overlapping section, and the sewn end parts are provided avoiding the sewn section.

4. The vehicle airbag device according to claim 3, wherein the inflator insertion holes and bolt insertion holes are provided on an imaginary straight line that passes through the overlapping section and connects the pair of sewn end parts of the outer sewn section.

5. The vehicle airbag device according to claim 2, wherein the inflator insertion holes and bolt insertion holes are provided on an imaginary straight line that passes through the overlapping section and connects the pair of sewn end parts of the outer sewn section.

6. The vehicle airbag device according to claim 1, wherein the sewn section along the expansion part edge forming the overlapping section is closed in an annular shape.

7. The vehicle airbag device according to claim 1, wherein the first and second of expansion parts each have an inflator insertion hole and a bolt insertion hole, and the inflator insertion hole and bolt insertion hole of the first and second of expansion parts overlap and communicate with each other at the overlapping section.

8. The vehicle airbag device according to claim 1, wherein the outer sewn section is formed so as to reach the edge of each of the expansion parts.

9. The vehicle airbag device according to claim 1, wherein the overlapping section has an encircling sewn section that encircles at least one of the inflator insertion holes and bolt insertion holes and joins the panel part and expansion part overlapping each other.

10. The vehicle airbag device according to claim 1, wherein the inflator is a cylinder type having a plurality of stud bolts spaced apart in the length direction, and these stud bolts are inserted into the inflator insertion holes.

11. The vehicle airbag device according to claim 1, wherein the pair of panel parts have a same outer shape.

12. The vehicle airbag device according to claim 1, wherein the bag body has an overhang in a position adjacent to the overlapping section in a form that juts over the overlapping section, and the overhang is provided by joining a pair of jutting parts that, while facing each other, protrude out from each of the first and second panel parts in the protruding direction of each of the first and second expansion part at the outer sewn section.

13. The vehicle airbag device according to claim 1, wherein the bag body is provided with an inflator in the overlapping section of the bag body with a stud bolt protruding through the bolt insertion hole, and the bag body is mounted and secured to the vehicle body via the stud bolts.

14. A method of manufacturing for the vehicle airbag device according to any one of claim 1, the method comprising:
- a step of forming the first and second panel parts, forming the first and second expansion parts in each of the first and second panel parts, which are folded or overlapped to face each other when manufacturing the airbag cushion, and forming the inflator insertion holes and bolt insertion holes in each of the expansion parts;
- a pre-sewing step of overlapping the first and second panel parts, overlapping the first and second expansion part of the first panel part on the second panel part and overlapping the expansion part of the second panel part on the first panel part, so that the inflator insertion holes and bolt insertion holes of each of the first and second expansion parts overlap and connect with each other;
- a sewing step of joining each of the first and second expansion part to each first and second panel part at the sewn sections along the edges of the first and second expansion parts to form the overlapping section;
- and a bag body forming step of joining the outer edges of the first and second panel parts facing each other at the outer sewn sections and forming them into the bag body.

15. The vehicle airbag device according to claim 1, wherein the inflator insertion holes and bolt insertion holes of the first and second panels are provided on first and second imaginary straight lines, respectively, that both pass through the overlapping section, wherein the first imaginary straight line passes through the first further expansion part and the second imaginary straight line passes through the second further expansion part.

* * * * *